(12) United States Patent
Olive

(10) Patent No.: US 7,581,693 B1
(45) Date of Patent: Sep. 1, 2009

(54) SHROUDED NOZZLE ARRANGEMENT

(75) Inventor: Clive Olive, Bristol (GB)

(73) Assignee: Rolls-Royce PLC, London (GB)

( * ) Notice: Subject to any disclaimer, the term of this patent is extended or adjusted under 35 U.S.C. 154(b) by 1770 days.

(21) Appl. No.: 09/862,979

(22) Filed: May 21, 2001

(30) Foreign Application Priority Data

Jun. 5, 2000 (GB) ................. 0014359.4

(51) Int. Cl.
*B64C 27/39* (2006.01)
(52) U.S. Cl. .................. 244/12.5; 244/12.2
(58) Field of Classification Search ........... 244/12.5, 244/12.2
See application file for complete search history.

(56) References Cited

U.S. PATENT DOCUMENTS

| | | | |
|---|---|---|---|
| 3,486,716 A * | 12/1969 | Haberkorn et al. | |
| 3,665,709 A * | 5/1972 | Medawar et al. | 60/232 |
| 3,797,785 A * | 3/1974 | Baerresen et al. | 239/265.31 |
| 3,837,577 A * | 9/1974 | Presz, Jr. | 239/265.11 |
| 3,893,640 A * | 7/1975 | Hull, Jr. et al. | 239/265.13 |
| 3,897,001 A * | 7/1975 | Helmintoller, Jr. et al. | 239/265.13 |
| 3,979,067 A * | 9/1976 | Nash | 60/230 |
| 4,050,631 A * | 9/1977 | Syltebo | 60/263 |
| 4,502,637 A | 3/1985 | Nightigale | 239/265.17 |
| 4,527,388 A * | 7/1985 | Wallace, Jr. | 60/204 |
| 4,587,806 A * | 5/1986 | Madden | 60/271 |

FOREIGN PATENT DOCUMENTS

| | | | |
|---|---|---|---|
| EP | 0518498 A1 | 12/1992 | |
| GB | 1067011 | * 4/1967 | ............ 244/12.5 |
| GB | 2118023 A | 10/1983 | |
| GB | 2119023 A | 11/1983 | |
| GB | 2247048 A | 2/1992 | |

OTHER PUBLICATIONS

Webster's New World Dictionary; copyright 1966; p. 1351.*

* cited by examiner

*Primary Examiner*—Stephen M Johnson
(74) *Attorney, Agent, or Firm*—Oliff & Berridge, PLC

(57) ABSTRACT

A shrouded nozzle arrangement for a gas turbine engine exhaust comprises a shrouded nozzle and duct means. The exhaust nozzle is translatable from a first position, wherein the exit plane of the nozzle lies upstream of the exit aperture of the shroud, to a second position, wherein the exit plane of the exhaust duct lies substantially downstream of the exit aperture of the shroud. In this second position, the use of reheat or thrust vectoring may be used without damage to the shroud.

17 Claims, 4 Drawing Sheets

SHROUDED NOZZLE ARRANGEMENT

BACKGROUND OF THE INVENTION

1. Field of the Invention

The present invention concerns a shrouded nozzle arrangement wherein a Low Observable Shrouded Exit Nozzle (LOSEN) is used to minimise the infra-red and radar signatures of a gas turbine engine exhaust.

2. Description of Related Art

Electromagnetic radiation, emitted or reflected by the gas turbine exit nozzle contributes significantly to the "signature" of a vehicle. By mounting the exit nozzle within a suitably shaped shroud this signature is reduced. Radar signals are absorbed or diffused by the shroud and infra-red emissions are masked, either by the shroud itself or by cool air ducted by the shroud to pass around the nozzle and the exhaust stream issuing from it. Such an arrangement, by its nature, defines a constraining envelope within which the nozzle must lie in order to be effective. This imposes constraints upon the use of reheat or thrust vectoring of the engine exhaust stream.

In a plane perpendicular to the engine centre line, the cross-sectional area of the shroud exit aperture is the same or only slightly larger than the exhaust stream in the same plane. As a consequence, the use of a thrust vectoring nozzle to direct the exhaust stream away from the engine centre line would inevitably cause hot exhaust gas to impinge upon the LOSEN shroud imposing impractical loads and temperatures. Similarly, a significant increase in exhaust gas temperature, caused by the use of reheat, would require significant cooling of the LOSEN shroud, imposing unacceptable performance penalties upon the engine.

SUMMARY OF THE INVENTION

The present invention seeks to provide an improved shrouded exit nozzle arrangement for a gas turbine engine that overcomes the limitations inherent in the existing design.

According to the present invention in its broadest aspect there is provided a shrouded nozzle arrangement for a gas turbine engine exhaust comprising an exhaust nozzle, a duct means for providing communication of exhaust gas between the gas turbine and exhaust nozzle, and a shroud which encloses the nozzle and duct means, the shroud having an exit aperture through which, in use, the exhaust nozzle discharges, characterised in that the exhaust nozzle is translatable from a first position, wherein the exit plane of the nozzle lies upstream of the exit aperture of the shroud, to a second position, wherein the exit plane of the exhaust duct lies substantially downstream of the exit aperture of the shroud.

BRIEF DESCRIPTION OF THE DRAWINGS

The invention will now be described in greater detail with particular reference to the embodiment illustrated, by way of example only, in the accompanying drawings in which:

Referring now to the drawings, FIG. 1 shows a view of the rear of an aircraft fitted with a LOSEN arrangement. A shroud 10 surrounds a nozzle 8 defining a shroud annulus 12 which is open at its downstream end.

DETAILED DESCRIPTION OF PREFERRED EMBODIMENTS

Figure 1:
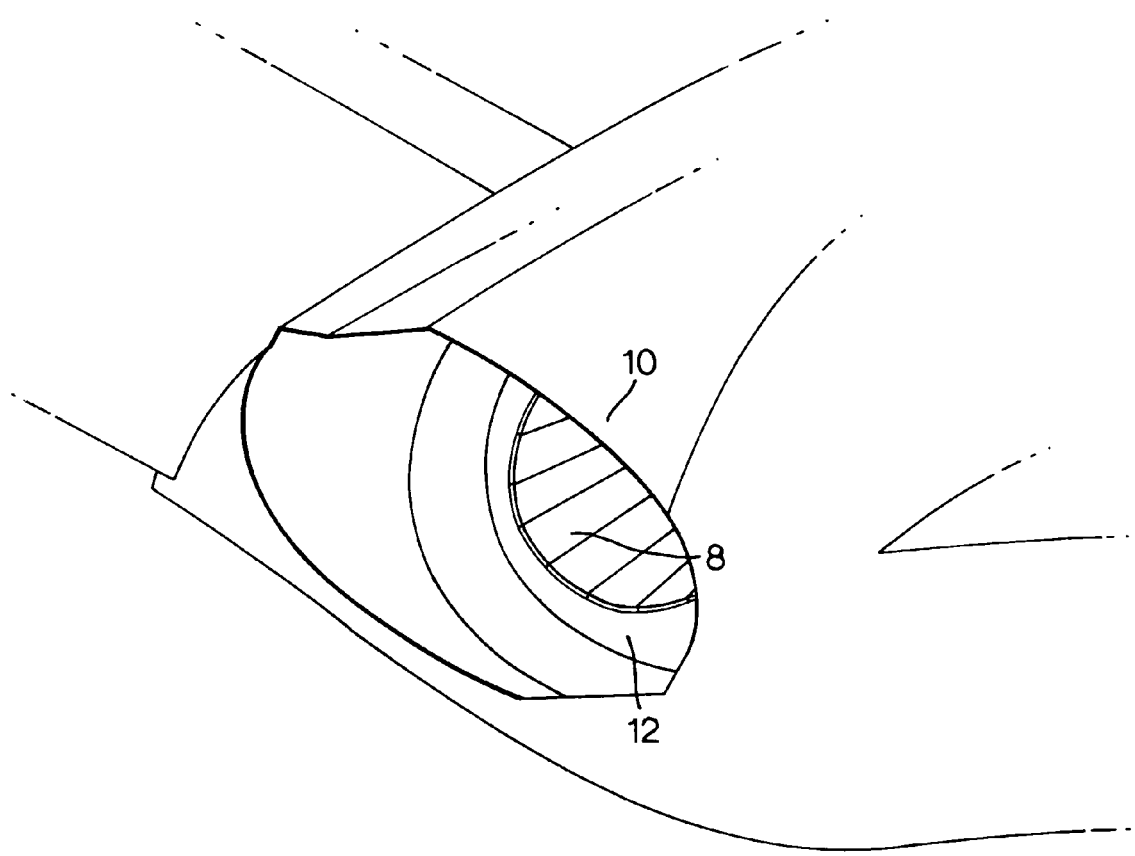
FIG. 1 shows a view of the rear of an aircraft equipped with a LOSEN arrangement.
Figure 2:
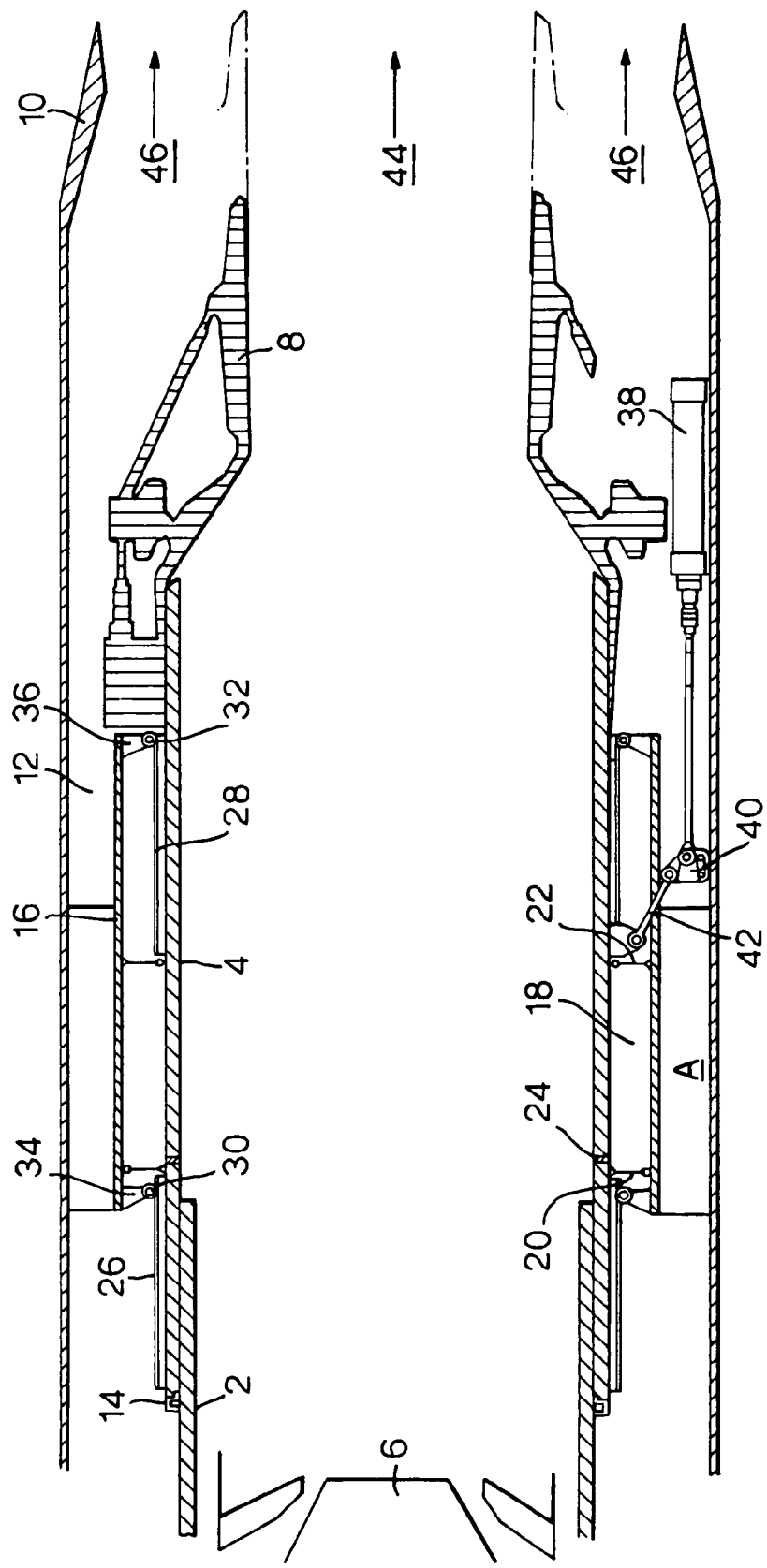
FIG. 2 shows a cross-section through the LOSEN arrangement in FIG. 1 with the nozzle in the retracted position.

In FIG. 2 there is shown a cross section through the LOSEN arrangement of FIG. 1. An annular duct means 2,4 provides communication between the exit of a reheat equipped gas turbine engine 6 and a thrust vectoring downstream nozzle 8. A shroud 10 surrounds the duct means 2,4 and the nozzle 8 defining a shroud annulus 12 within the shroud.

The duct means 2,4 comprises an annular inner duct member 2 attached at its upstream entrance to the turbine engine 6 exit and an annular outer duct member 4, attached at its downstream exit to the nozzle 8. The two duct members 2,4 are concentric and overlap such that an essentially continuous duct means is formed between engine 6 and nozzle 8. A gas tight seal is provided between the inner duct member 2 and outer duct member 4 by a ring 14.

The inner duct is fixed relative to the shroud 10. The outer duct member 4 is slideably mounted to a support barrel 16 which lies within the shroud 10 and surrounds the outer duct member 4. This support barrel 16 is attached to the shroud 10 and remains fixed relative to the shroud 10 and inner duct member 2.

Figure 3:
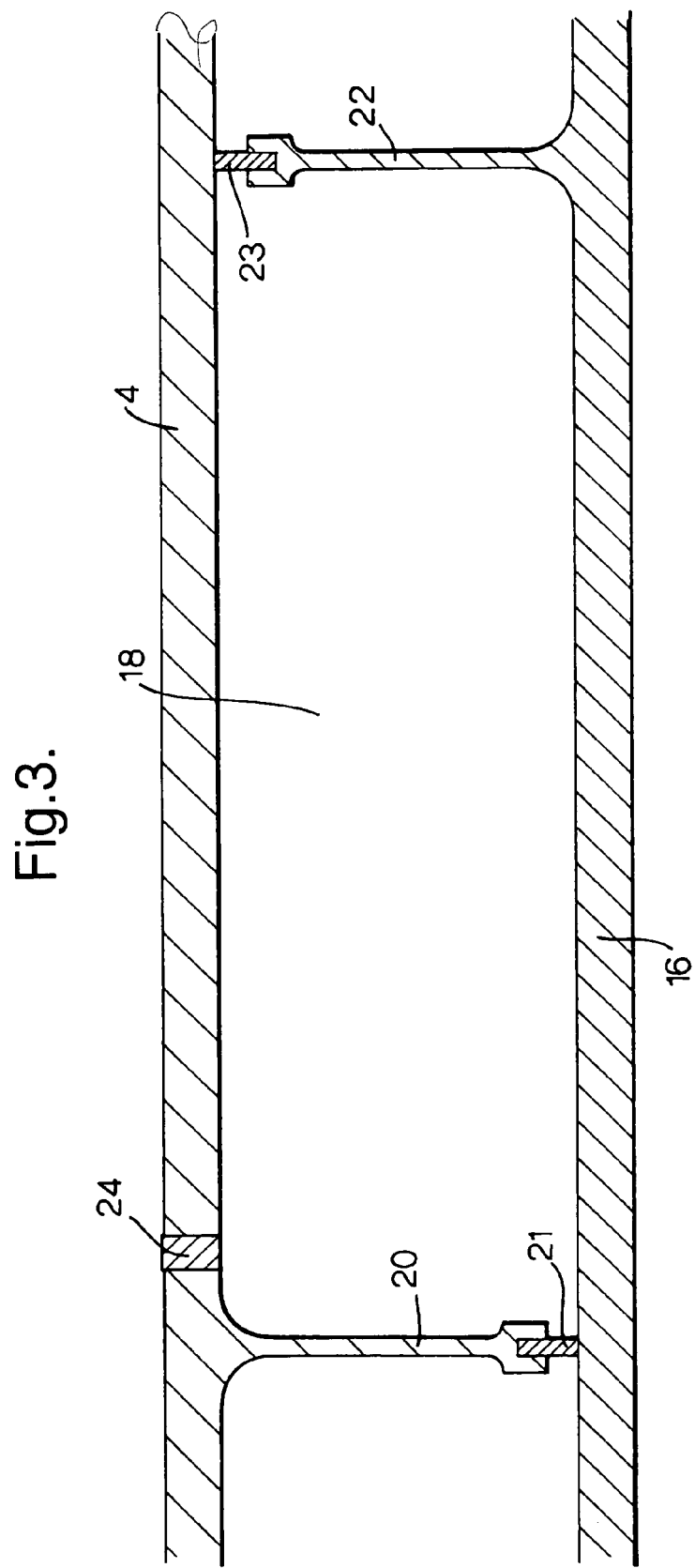
FIG. 3 shows a more detailed view of section A of FIG. 2.

Referring now to FIG. 3, the support barrel 16 and the outer duct member 4 are radially spaced to form an annulus. This annulus is partitioned by annular first and second flanges 20,22 to create a chamber 18. The first flange 20 forms the upstream wall of the chamber 18 and is attached to the outer duct member 4, projecting outwards to slideably engage the support barrel 16 about its inner surface. The second flange 22 forms the downstream wall of the chamber 18 and is attached to the support barrel 16 projecting inwards to slideably engage the outer duct member 4 about its outer surface. Both flanges 20,22 utilise gas-tight rings 21,23 for their engagement means. Finally, a hole 24 in the outer duct member 4 provides communication between the chamber 18 and inside of the duct member 2,4.

Referring back to FIG. 2, a pair of rails 26,28 lies either side of the chamber 18 and these are provided at a number of radial positions around the external surface of the outer duct member 4. The rails 26,28 run in concomitant bearings 30,32 which enable axial movement. The bearings 30,32 are retained by supports 34,36 fixed to the support barrel 16.

Three hydraulic ram actuators 38 are equi-spaced radially about the inside of the shroud 10, each fixed at a one end to the inner surface of the shroud 10. The opposite end of each actuator 38 is attached to a carriage 40 slideably mounted between the inner surface of the shroud 10 and the outer surface of the support barrel 16. The carriage 40 is in turn attached to the outer duct member 4 by a linkage 42 passing through an axial slot in the support barrel 16, lying downstream of the chamber 18.

In normal operation, the actuators 38 are locked at their full extension. Via the carriage 40 and lever 42, the duct means 2,4 is reduced to its shortest length. The exit plane of the nozzle 10 is thus withdrawn into the shroud 10 and lies upstream of the exit aperture of said shroud 10.

In this configuration, radar signals are either diffused by the shroud 10 or absorbed by special coatings applied to it. At the same time, exhaust gas 44 issuing from the exit of the gas turbine engine 6 passes down the duct means 2,4 and through the nozzle 8. Secondary air 46, taken from the airflow outside the shroud is directed through the shroud annulus. This secondary air 46 is at a lower temperature and pressure than the exhaust gas 44 and so cools the duct means, 2,4, nozzle 8 and shroud 10 thus reducing the infra-red signature as well as protecting any sensitive coatings applied to the shroud. The secondary air 46 is then directed by the shroud 10 exit aperture to form a sheath of cool air around the exhaust gas 44 leaving the nozzle. This covering of cool air masks the infra-red signature of the exhaust plume.

Figure 4:
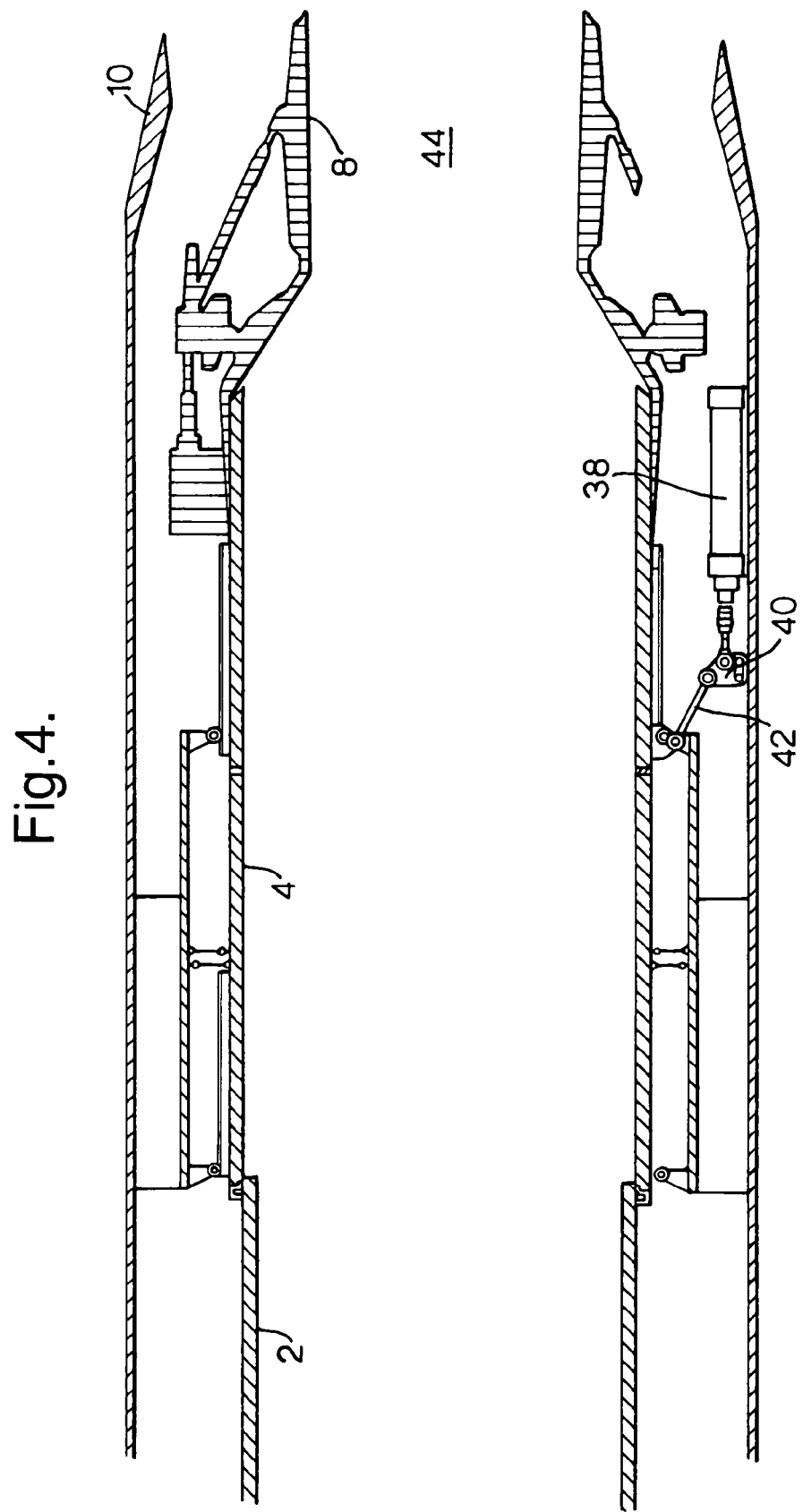
FIG. 4 shows a cross-section through the LOSEN arrangement in FIG. 1 with the nozzle in the extended position.

Referring now to FIG. 4, when it is necessary to use reheat or operate the thrust vectoring nozzle 8, the actuators 38 are retreated to their shortest length. Via the carriage 40 and lever 42, the duct means 2,4 is extended to its fullest length. The exit plane of the nozzle 10, attached to the downstream end of the outer duct member 4 is thus projected substantially beyond the exit aperture of the shroud 10. This facilitates the use of reheat or thrust vectoring. Reheat is possible as the superheated exhaust gas 44 leaves the nozzle 8 aft of the shroud 10 and is not able to impinge upon the shroud 10. Likewise, the use of thrust vectoring does not result in hot exhaust gas 44 impinging upon the shroud 10. Whilst the invention remains in this configuration, the shroud will be ineffective at reducing the signature of the exit nozzle 8 or its efflux, however, reheat and thrust vectoring are unlikely to be used at times when the aircraft's signature is important.

Referring again to FIG. 3, it will be seen that during operation, the pressure within the chamber 16 is higher than that either side of the flanges 20,22. The pressure within the chamber is that of the exhaust gas 44 issuing from the engine 6 but the opposite side of each flange is in communication with the secondary air 46 at a lower pressure than the exhaust gas 44. As a result, the pressure acting upon the first flange 20 creates an axial force acting in the upstream direction, offsetting the axial loads in the downstream direction imposed by exhaust gas 44 acting upon the nozzle. This serves to minimise the work required by the actuators 38 to move or restrain the outer duct member 4 and nozzle 8.

In the embodiment of the invention shown, the duct members 2,4 are arranged with the inner duct member 2 fixed and located upstream of the outer duct member 4 which is slideably mounted. Alternatively, the outer duct member may be fixed and located upstream of a slideably mounted inner duct member.

The actuation system described for this embodiment comprises actuators 38 rigidly fixed at one end to the shroud 10 and operating the slideable duct member 4 via a carriage 40 and linkage 42. Alternatively, the actuators may be pivoted at their attachment point on the shroud such that the carriage 38 and linkage are not necessary. It will also be understood that the number of actuators 38 need not be strictly limited to three although this does seem to be the minimum to guarantee the slideable duct 4 member does not rock when operated.

Finally, although the embodiment of the invention features both thrust vectoring and reheat, the invention itself is equally applicable where only thrust vectoring or only reheat is required.

The invention claimed is:

1. A shrouded nozzle arrangement for a gas turbine engine exhaust gas comprising a gas turbine, an exhaust nozzle, a duct means for providing communication of exhaust gas between the gas turbine and the exhaust nozzle, and a shroud which encloses the nozzle and duct means, the shroud having an exit aperture through which, in use, the exhaust nozzle discharges, wherein the exhaust nozzle is translatable from a first position, wherein an exit plane of the nozzle lies upstream of the exit aperture of the shroud, to a second position, wherein the exit plane of the exhaust duct lies substantially downstream of the exit aperture of the shroud; and
wherein the duct means comprises an inner duct member and an outer duct member concentric with one another, wherein the inner and outer duct members are slideably mounted and movable relative to one another, the outer duct member at all times overlapping the inner duct member such that inner and outer duct members provide continuous duct means.

2. A shrouded nozzle arrangement as claimed in claim 1 wherein a substantially annular support means is provided, the support means remaining fixed relative to one of the duct members the other duct member being slideably mounted within the support means and moving relative to the support means.

3. A shrouded nozzle arrangement as claimed in claim 2 wherein a reheat system is provided within the duct means.

4. A shrouded nozzle arrangement as claimed in claim 2 wherein the nozzle is capable of thrust vectoring.

5. A shrouded nozzle arrangement as claimed in claim 2 wherein the shroud is configured to minimise the radar and infra-red signatures of the nozzle and exhaust gas issuing from the nozzle.

6. A shrouded nozzle arrangement as claimed in claim 2 wherein the support means is provided with an inwardly projecting first flange, the first flange slideably engaging the slideable duct member about an annular periphery to provide a substantially gas tight seal, the slideable duct member provided with an outwardly projecting second flange, the second flange slideably engaging the support means about an annular periphery to provide a substantially gas tight seal, the first and second flanges defining a chamber between support means and slideable duct member into which exhaust gas may be held from within the duct means the first and second flanges being disposed such that pressure within the chamber acts upon the slideable duct member to counter the loads imposed by exhaust gas impinging upon the exit nozzle.

7. A shrouded nozzle arrangement as claimed in claim 6 wherein the nozzle is capable of thrust vectoring.

8. A shrouded nozzle arrangement as claimed in claim 6 wherein the shroud is configured to minimise the radar and infra-red signatures of the nozzle and exhaust gas issuing from the nozzle.

9. A shrouded nozzle arrangement as claimed in claim 6 wherein a reheat system is provided within the duct means.

10. A shrouded nozzle arrangement as claimed in claim 1 wherein a reheat system is provided within the duct means.

11. A shrouded nozzle arrangement as claimed in claim 1 wherein the nozzle is capable of thrust vectoring.

12. A shrouded nozzle arrangement as claimed in claim 1 wherein the shroud is configured to minimise the radar and infra-red signatures of the nozzle and exhaust gas issuing from the nozzle.

13. A shrouded nozzle arrangement for a gas turbine engine comprising,
an exhaust nozzle, defining an upstream inlet aperture and a downstream exit aperture, said exit aperture having an exit plane,
duct means defining an upstream aperture in flow communication with the gas turbine engine, and a downstream aperture in flow communication with the exhaust nozzle inlet aperture, the duct means in use providing flow communication of an exhaust gas between the gas turbine engine and the exhaust nozzle, and,
a shroud, defining an upstream aperture and a downstream aperture, said shroud enclosing the exhaust nozzle and duct means,
said exhaust nozzle being translatable from a first position, wherein the exit plane of the nozzle lies upstream of the downstream aperture of the shroud, to a second position, wherein the exit plane of the exhaust nozzle lies substantially downstream of the downstream aperture of the shroud; and
wherein the duct means comprises an inner duct member and an outer duct member concentric with one another, wherein the inner and outer duct members are slideably mounted and movable relative to one another, the outer duct member at all times overlapping the inner duct member such that inner and outer duct members provide continuous duct means.

14. The shrouded nozzle arrangement of claim 13, wherein said exhaust nozzle is translatable as a unit from said first position to said second position.

15. The shrouded nozzle arrangement of claim 14, wherein the exit plane of the nozzle lies fully upstream of the downstream aperture of the shroud.

16. A shrouded nozzle arrangement as claimed in claim 13 wherein a substantially annular support means is provided, the support means remaining fixed relative to one of the duct members the other duct member being slideably mounted within the support means and moving relative to the support means.

17. A shrouded nozzle arrangement as claimed in claim 16 wherein the support means is provided with an inwardly projecting first flange, the first flange slideably engaging the slideable duct member about an annular periphery to provide a substantially gas tight seal, the slideable duct member provided with an outwardly projecting second flange, the second flange slideably engaging the support means about an annular periphery to provide a substantially gas tight seal, the first and second flanges defining a chamber between support means and slideable duct member into which exhaust gas may be held from within the duct means the first and second flanges being disposed such that pressure within the chamber acts upon the slideable duct member to counter the loads imposed by exhaust gas impinging upon the exit nozzle.

* * * * *